Sept. 13, 1938.     R. W. JOHNSON     2,129,938
VALVE
Filed Jan. 2, 1937

INVENTOR
Roy W. Johnson
BY
John W. Michael
ATTORNEY

Patented Sept. 13, 1938

2,129,938

UNITED STATES PATENT OFFICE 2,129,938

VALVE

Roy W. Johnson, Milwaukee, Wis.

Application January 2, 1937, Serial No. 118,779

2 Claims. (Cl. 137—139)

This invention relates in general to an improvement in valves and more particularly to an improved electromagnetically controlled fluid pressure operated valve especially designed for use in refrigeration and air conditioning applications.

One of the objects of the present invention is to provide a valve of this character which will open easily and efficiently under high pressures.

Another object is to provide a valve of this character which is simple and durable in its construction, reliable and efficient in operation, and easy and comparatively inexpensive to manufacture and install. The various elements making up the valve are closely and compactly organized and yet are readily accessible for replacement or repair.

Figure 1:
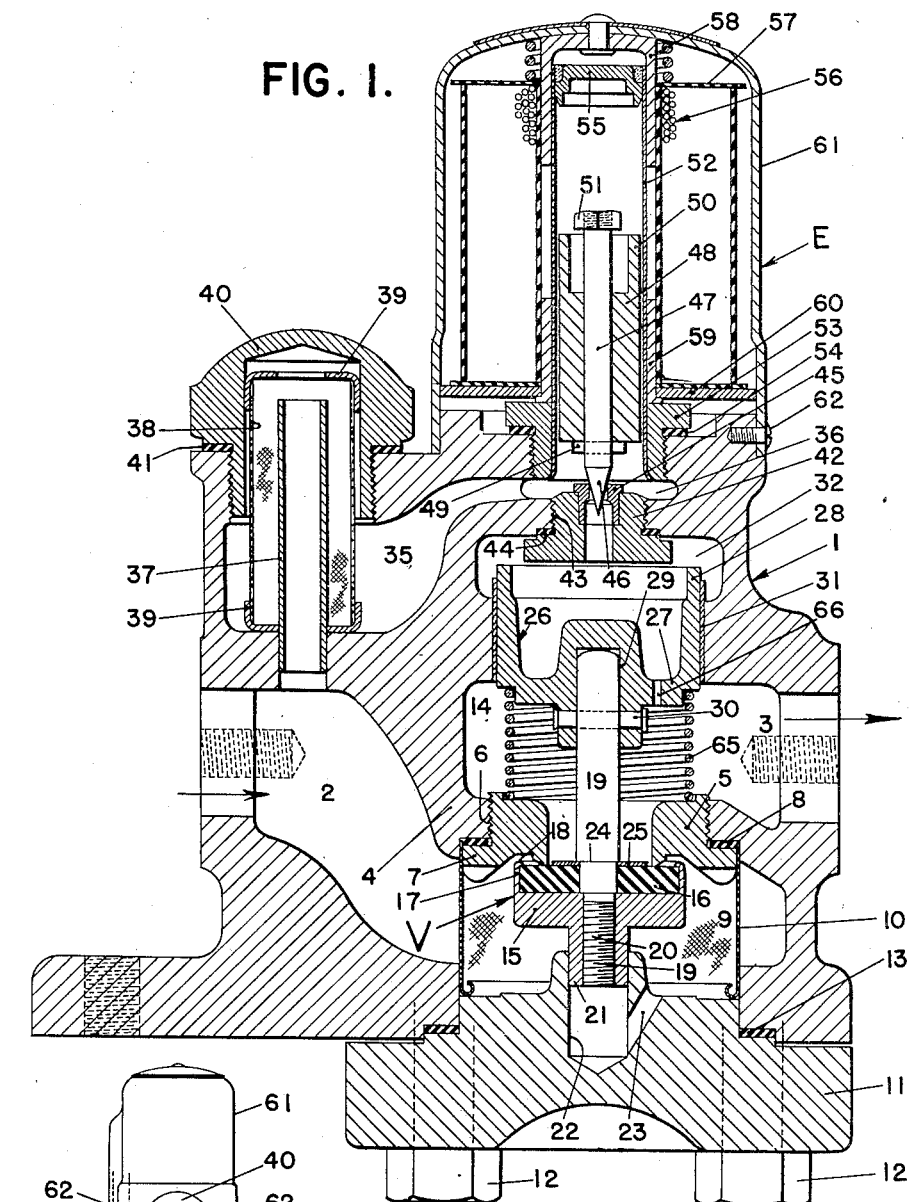
Figure 2:
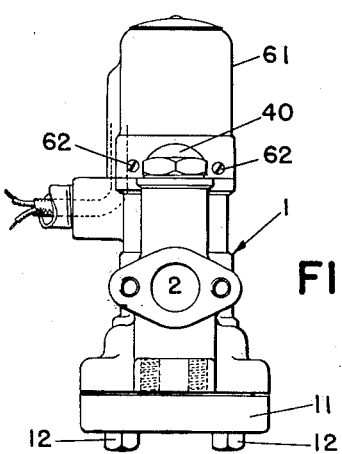

Other objects and advantages reside in certain novel features of the construction, arrangement and combination of parts which will be hereinafter more fully pointed out and particularly claimed in the appended claims, reference being had to the accompanying drawing, forming a part of this specification, and in which:

Figure 1 is a view in longitudinal central vertical cross section showing a valve constructed in accordance with the present invention; and Figure 2 is a view thereof in end elevation and on a reduced scale.

Referring to the drawing, the numeral 1 designates generally a valve casing which is provided with an inlet passage-way 2 and an outlet passage-way 3. Between the inlet passage 2 and the outlet passage 3 the casing is provided with an integral internal ported partition 4. A valve seat 5 is threadedly connected with the ported partition 4 as indicated at 6 and has an outwardly projecting peripheral flange 7 near its lower end which, in the assembly, compresses a gasket 8 interposed between it and the underside of the ported partition 4.

Below the partition 4 and its valve seat 5, a main valve chamber 9 is provided and communicates freely with the inlet passage 2, although a strainer or screen 10 may be interposed between the inlet passage-way 2 and the valve chamber 9 if desired. This strainer is held in place by the flange 7 of the valve seat and by means of a removable bottom plate 11 which is detachably secured to the casing by bolts 12. A gasket 13 is interposed between the removable bottom plate 11 and the casing 1.

Above the valve seat 5 and freely communicating with the outlet 3 is an outlet chamber 14. A main valve designated generally at V cooperates with the valve seat 5, this valve V being disposed in the valve chamber and seating upwardly against the seat 5. The main valve V comprises a metallic disc 15, to the upper surface of which a valve facing 16 is applied. This facing is constituted of tough rubber, rubber composition or other tough elastic material and is held to the body of the valve by means of a flange 17 formed integral with the valve body 15 and having its upper edge spun inwardly over the facing as indicated at 18. The valve V is secured to a valve stem 19, this stem having portions passing through central openings in the valve facing and in the valve body 15 and having a lower threaded portion 20 which engages internal threads in the opening of the valve body and in a tubular extension 21 thereof.

The tubular extension 21 has its periphery machined and is a sliding fit in a guide-way 22 provided in the removable bottom plate 11. The guide-way 22 communicates with the valve chamber 9 by means of a passage-way 23.

Interposed between the center part of the valve facing and a shoulder 24 provided on the valve stem is a metal washer 25.

The valve stem 19 projects up through the valve seat into the outlet chamber and has its upper end connected to a piston 26. The piston 26 is made up of a head 27 and a skirt or body portion 28. The head 27 is provided with a downwardly opening socket 29 which receives the upper end of the valve stem 19. A pin or rivet 30 secures the valve stem to the socket 29.

The piston 26 is a working fit in a cylinder 31 provided at the lower end of a fluid pressure chamber 32.

The supply of fluid under pressure from the inlet side of the valve to the chamber 32 is controlled by means of an electromagnetically operated pilot valve designated generally at E. For this purpose a bypass 35 leads from the inlet passage 2 to a pilot valve chamber 36 located just above the fluid pressure chamber 32. Communication between the inlet passage 2 and the bypass 35 is had through an open ended vertical tube 37, the lower end of which freely communicates with the inlet 2 and the upper end of which communicates with the interior of a perforated strainer tube 38. This strainer tube 38 is equipped at its ends with metal caps 39, the upper of which is a tight and sealed fit in the opening of a removable cap 40 threadedly connected with the casing 1 and sealed thereto by a gasket 41. The strainer construction is such as to intercept any particles and preclude their passage to the pilot valve.

A flanged bushing 42 is threadedly interconnected with the wall of an opening 43 provided between the pilot valve chamber 36 and the fluid pressure chamber 32. This bushing is equipped with a gasket 44. The bushing 42 carries a valve seat 45 with which the tapered lower end 46 of a pilot valve 47 is cooperable.

Slidably mounted on the pilot valve 47 is an armature or core 48 of the electromagnet. The lower end of this armature is engageable with a cross pin 49 carried by the pilot valve whenever the electromagnet is de-energized. The recessed upper end 50 of the armature 48 is engageable with a head or nut 51 provided on the upper end of the pilot valve 47 when the electromagnet is energized and the armature pulled upwardly. The arrangement is such that the armature 48 gains momentum before engaging the head 51 to insure easy opening of the valve even when working under high pressures.

The armature 48 is a sliding fit in a cylinder 52 of non-magnetic material. The lower end of this cylinder is mechanically secured to and hermetically interfitted with a flanged bushing 53 which is threaded into the upper end of the casing 1 and sealed thereto by a gasket 54. The upper end of the cylinder 52 is closed and sealed by an end plate 55.

Surrounding the cylinder 52 is an electromagnetic winding designated diagrammatically at 56 and enclosed in an insulating casing 57. Flux sleeves 58 and 59 and flux washer 60 are associated with the electromagnetic winding as shown in the drawing. A metallic shell-like cover 61 encloses the electromagnet and is releasably secured to the upper end of the casing by screws 62.

In operation, if the electromagnet is energized the armature 48 is pulled upward a short distance so as to gain momentum before striking the head 51 and lifting the pilot valve 47 from its seat. The armature 48 and the needle valve 47 float in the tube 52 enclosed by the electromagnetic winding and do not touch the top of the tube in the open position of the pilot valve. Both the tube and the valve are non-magnetic so that no mineral particles can be attracted. Consequently, when the electromagnet is de-energized both the valve 47 and the armature 48 fall to force the tapered lower end 46 of the valve into sealing engagement with its valve seat 45.

When the valve 47 is opened fluid under pressure flows from the inlet passage 2 through the tube 37 and the strainer 38 to the bypass 35 and thence from the bypass past the valve 47 and to the fluid pressure chamber 32. In the chamber 32 the fluid under pressure acts on the piston 26 and as the area of the piston is greater than the area of the main valve V the piston is forced downwardly automatically opening the main valve against the pressure acting thereon and against the action of its spring 65.

The spring 65 is interposed between the valve seat 5 and the underside of the piston and tends to force the piston upwardly and consequently to bias the main valve V to closed position.

When the electromagnet is de-energized the pilot valve 47 falls to its closed position and consequently shuts off the supply of fluid pressure from the inlet through the bypass 35 to the fluid pressure chamber 32. The fluid under pressure in the chamber 32 bleeds to the outlet side of the valve through a small hole 66 in the head of the piston and consequently the valve V closes under the influence of its spring 65 and with the pressure.

It will be understood that by removing the bolts 12, the bottom plate 11 may be taken off. Then by unscrewing the valve seat 5 this valve seat together with its valve V and the piston 26 may be readily removed. The opening in the lower portion of the casing, when plate 11 is removed, is sufficiently large to permit of this disassembly. Furthermore, by unscrewing the flanged bushing 42 this bushing and the pilot valve seat, as well as the pilot valve 47 and its armature 48, may all be removed through the bottom of the casing. If it is not desired to remove the main valve but merely to have access to the pilot valve the screws 62 may be backed off and the cover 61 with the flux sleeve 58 pulled off of the electromagnet. Then by removing the electromagnetic winding and its casing access may be had to the flanged bushing 53 so that it may be backed off and access had to the pilot valve chamber.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. A valve comprising a casing having an inlet and an outlet and provided with a ported partition therebetween, a valve seat removably connected with said ported partition, there being a main valve chamber below said partition communicating with said inlet and an outlet chamber above said partition communicating with said outlet, said chambers being vertically alined, a main valve in said main valve chamber and cooperable with said seat, said casing having a fluid pressure chamber vertically alined with said outlet chamber and disposed thereabove, said fluid pressure chamber being provided with a cylinder, a piston fitted in said cylinder, a stem secured to said main valve and said piston, means coacting with said casing to define a pilot valve chamber above and vertically alined with said aforementioned chambers, a valve seat removably connected with said casing and disposed in said pilot valve chamber, an electromagnetically actuated pilot valve cooperable with said last-named seat, there being a bypass between said inlet and said pilot valve chamber, said casing having a removable bottom plate providing for access to all said chambers and for the removal of said main valve, its valve seat, said stem, said piston, said pilot valve seat and said pilot valve through the bottom of said casing when said plate is removed.

2. A valve comprising a casing having an inlet and an outlet and provided with a ported partition therebetween, said ported partition having a valve seat, a main valve cooperable with said valve seat and biased to closed position, said casing having a fluid pressure chamber provided with a cylinder, a piston fitted in said cylinder, said piston being of greater area than the main valve, said cylinder and said fluid pressure chamber providing a confined space of substantial volume, means connecting the piston and the main valve, said piston, when moved under the influence of fluid under pressure, serving to open the main valve, there being a bleed hole through the piston to the outlet side of the main valve, said casing having a bypass between the inlet and the fluid pressure chamber, a valve seat located in said bypass and having a restricted orifice through which fluid under pressure may flow from the inlet to the fluid pressure chamber, an electromagnetically controlled pilot valve cooperable with said last-named valve seat to regulate flow therethrough and comprising a needle valve, an armature cooperable with said needle valve, a cylinder in which said armature is slidably fitted, the upper end of the cylinder being closed, a bushing secured and sealed to the lower end of the cylinder and also releasably secured and hermetically sealed to the valve casing, and an electromagnetic winding surrounding the cylinder, said electromagnetic winding, said cylinder and said bushing being removable as a unit to provide for access to said pilot valve.

ROY W. JOHNSON.